350-276
CROSS REFERENCE SEARCH ROOM

July 28, 1959 D. K. RIGNEY ET AL 2,897,488

TELEVISION PICTURE CLARIFIER

Filed May 22, 1953

INVENTORS:
Daniel K. Rigney and
BY Catherine E. Carpenter
Louis Sheldon
Atty 2,897,488
Patented July 28, 1959

2,897,488

TELEVISION PICTURE CLARIFIER

Daniel K. Rigney and Catherine E. Carpenter, Chicago, Ill.

Application May 22, 1953, Serial No. 356,712
3 Claims. (Cl. 340—369)

This invention relates to television, and is concerned more particularly with improvement of the visible image on the screen of the picture tube.

The raster appearing on the screen of a television receiver tube is characterized by a large number of electro-optically produced horizontal light lines which alternate with dark lines representing the portions of the screen which do not light up, inasmuch as the sensitive surface of the screen is not bombarded by electrons during the return stroke of the sweep. Conventionally there are 525 light lines across the vertical diameter of the screen, regardless of the size of the screen, so that, on a screen of about 16" diameter and up, the dark lines are so prominent that they distract the viewer and interfere seriously with the view and enjoyment of the picture.

It is accordingly an object of the invention to provide means for effectually rendering the television viewer unaware of the presence of the horizontal dark lines conventionally appearing on the television tube screen.

Another object is to provide a television tube such that the image as seen by the viewer is substantially devoid of the dark horizontal lines visible on the conventional screen.

A further object is to provide a television receiver such that the picture seen by the viewer is in effect a halftone photograph.

It is also an object to provide, in association with a television receiver means for so interrupting the conventional horizontal lines as to present to the viewer a picture having the attributes of a half-tone photograph.

An additional object is to provide mechanical means adapted to be attached to a television receiver in a position to render the viewer unaware of the horizontal dark lines conventionally appearing on the television tube screen.

It is another object to provide inexpensive means adapted to be readily applied to a television receiver by an unskilled person and operative to render invisible the dark lines conventionally appearing on the television tube screen.

Further objects and advantages of the invention will appear as the description proceeds.

The invention will be better understood upon reference to the following description and the accompanying drawing, in which.

Figures 1, 2, 3, 4, 5, 6, 7, 8, 9, 10:
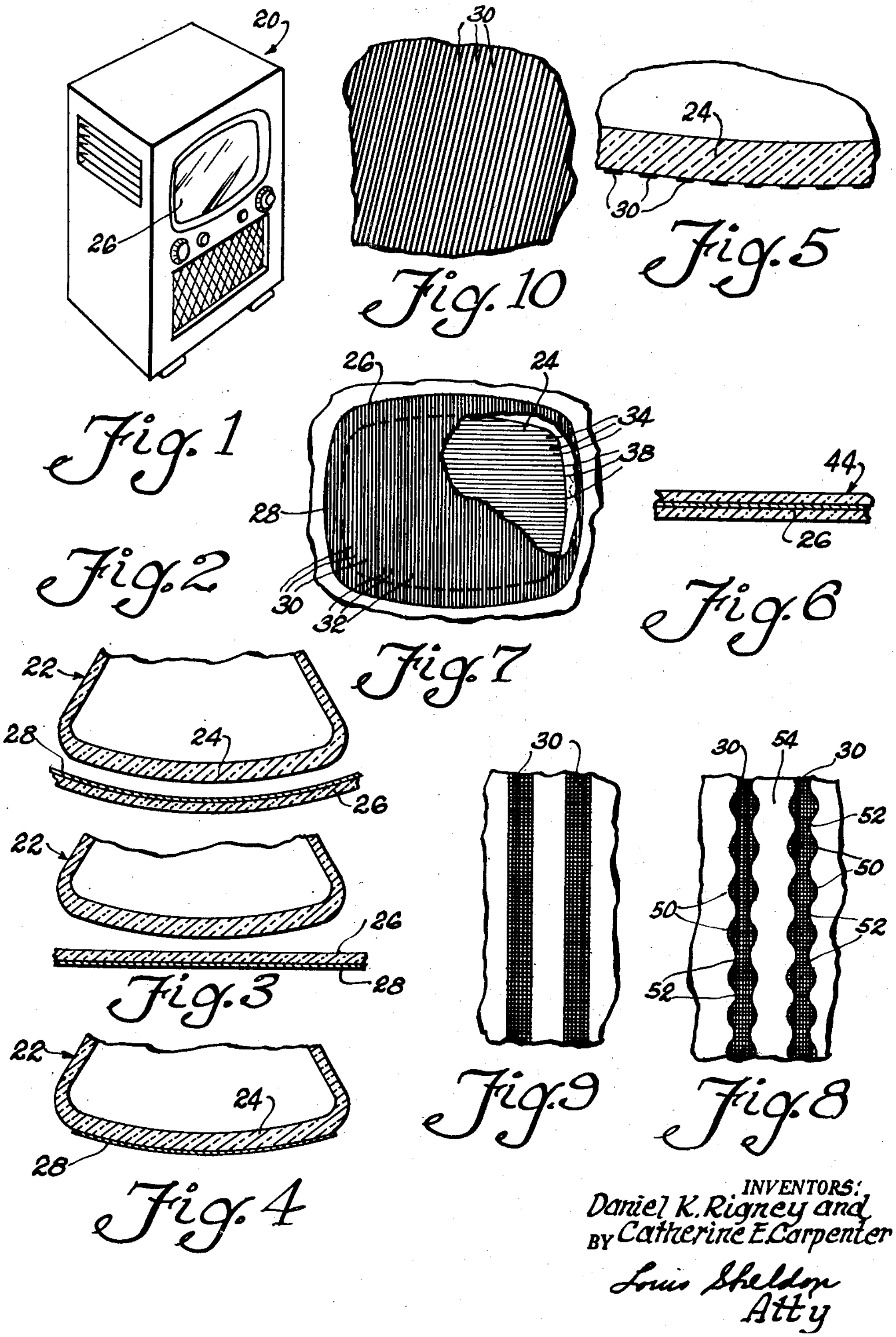
Fig. 1 is a perspective view of a television receiver embodying features of the invention.
Fig. 2 is an enlarged fragmentary sectional view showing an embodiment of the invention.
Figs. 3 to 6 are similar to Fig. 2 but show different forms of the invention.
Fig. 7 is a front elevational view showing the arrangement appearing in Fig. 3.
Figs. 8 and 9 are magnified fragmentary elevational views showing two different shapes of vertical lines embodying features of the invention.
Fig. 10 is a fragmentary elevational view showing an inclined line arrangement in accordance with the invention.

Referring now more particularly to the drawing, showing illustrative embodiments of the invention, there appears at 20 a television receiver comprising a picture tube 22 having a screen 24 confronted by a transparent shield 26. In accordance with one form of the invention, there is provided a transparent flexible film or other sheet 28 bearing parallel opaque lines 30 spaced apart at uniform intervals 32, the number of such lines per inch being substantially equal to the number of light lines 34 per inch for which the picture tube screen in connection with which the sheet is to be used is designed. For example, if a 21" tube is used, the number of light lines per inch on the screen is 25, and accordingly the number of opaque lines per inch on the sheet 28 should be substantially equal to 25. The sheet 28 may be adhesively secured to a surface 36 of the shield 26 in such arrangement that when the shield is mounted on the television receiver the opaque lines 30 extend vertically, i.e., at right angles to the dark and light cross lines 38 and 34 seen when a raster appears on the picture tube screen 24.

The resulting apparent network of horizontal dark lines 38 and vertical opaque lines 30 cooperate and blend visually to present to the viewer a picture with substantially the clarity of a half-tone newsprint photograph, wherein close examination through a magnifying glass shows the entire area to be formed of seemingly innumerable tiny light and dark surfaces, the dark surfaces being of greater or less area according as the portion of the picture at which they are located is darker or lighter. The picture thus produced is substantially free of the visually distracting and irritating quality characteristics of conventional television pictures, and is characterized by noticeably sharper contrast and detail.

As noted above, the picture electro-optically produced on the screen is formed of alternating dark and light horizontal lines. These lines are continuous entirely across the screen. Each line is of uniform width when there is a raster but no picture. When there is a picture, each light line concerned with the picture is of varying width, and is narrower at shadow areas and wider at highlights and of intermediate widths at intermediate light densities, and each dark line varies in width complementally to the adjacent light line. As noted above, the conventional dark lines are unfortunately clearly noticeable under optimum viewing conditions, particularly in the larger tubes (16" up) which are becoming increasingly popular, and these lines have the effect moreover of reducing the intensity of the highlights being reproduced. Furthermore, the light lines, by reason of their continuity, reduce the intensity of the shadows being reproduced. Thus the image is too dark at the highlights and too light at the shadows.

It might appear at first blush in view of the presence of the conventional horizontal dark lines on the screen and the transverse lines added in accordance with the invention that the picture seen by the viewer would consist of a network of continuous vertical lines of uniform width and continuous cross lines of varying width. However, actually that is not the case. Instead, the picture has the clarity and appearance of a true half-tone, with proper contrast between the highlight and shadow areas in correspondence with the objective of the camera, and thus the image falling on the screen is corrected. For a given brightness and contrast adjustment of the receiver, where the conventional scene has a pale cast, the picture obtained by use of the invention is characterized by highlights and shadows accentuated to conform practically perfectly to the objective of the television camera.

The added dark lines in accordance with the invention appear to have the additional effect of substantially reducing reflection of lamps and ambient light.

The sheet 28 may be attached to the back of the shield 26 (Fig. 2) or to the front thereof (Fig. 3) or to the front of the screen (Fig. 4), or printed or etched on the front of the screen (Fig. 5), or bonded between two plates of a safety-glass type of shield 44 (Fig. 6). If applied to the back of the screen, the lines or sheet bearing them should preferably be applied directly on the glass and the photo sensitive material applied so that it covers the lines or sheet.

The lines added in accordance with the invention may be wider or narrower than the intervals therebetween, and a ratio of about 3/7 to about 3/2 will give improved results.

If the added lines in accordance with the invention are of the form shown in Fig. 8, wherein each line consists of numerous wide convex portions 50, which may be generally oval-shaped, alternating with relatively narrow neck portions 52, good results are obtained if the width of each convex portion is substantially equal to the width of the space 54 between a convex portion on one line and the juxtaposed convex portion on the next line. The number of convex portions per inch may be more or less equal to the number of lines per inch, or may be substantially different in number per inch.

If the added lines in accordance with the invention are of uniform width (Fig. 9), good results are obtained when the width of each line is about 2/3 of the width of the adjoining space.

Satisfactory results may be obtained if the lines added in accordance with the invention are inclined to the horizontal, as shown in Fig. 10. A proper contrast between the highlights and the shadows will be presented to the viewer if the angle is held within such limits as to avoid a moire effect. Confining the lines of the invention beyond about 15° to the horizontal appears to give satisfactory results.

Mention is made above of the use of black, dark or opaque lines in accordance with the invention. In the case of color television the color of such added lines may be black or dark with similar improvement in the picture seen by the viewer.

Various modifications may suggest themselves to those skilled in the art without departing from the spirit of our invention. Hence we do not wish to be restricted to the specific forms shown or uses mentioned, except to the extent indicated in the appended claims, which are to be interpreted as broadly as the state of the art will permit.

We claim:

1. A television receiver comprising a television tube having a screen, and means affording spaced vertical opaque lines across the screen area, said lines being substantially equal in number per inch to the horizontal light lines electro-optically produced on the screen, each opaque line being in the form of a chain of dots of convexly rounded contour.

2. Means for cooperating with a television tube screen to present to the viewer a scene having the appearance of a half-tone picture, said means comprising a transparent sheet bearing parallel mutually spaced opaque lines and adapted to confront the entire visible area of the screen with said lines extending substantially vertically across said area, said lines being substantially equal in number per inch to the horizontal light lines electro-optically produced on the screen, each opaque line being in the form of a chain of dots of convexly rounded contour.

3. Means for cooperating with a television tube screen to present to the viewer a scene having the appearance of a half-tone picture, said means comprising a transparent sheet bearing parallel mutually spaced opaque lines and adapted to confront the entire visible area of the screen with said lines extending substantially vertically across said area, said lines being substantially equal in number per inch to the horizontal light lines electro-optically produced on the screen, each opaque line being in the form of a chain of dots of convexly rounded contour, the width of said dots being substantially equal to the width between juxtaposed dots of successive opaque lines.

References Cited in the file of this patent

UNITED STATES PATENTS

| | | |
|---|---|---|
| 2,053,173 | Astima | Sept. 1, 1936 |
| 2,388,203 | Zindel | Oct. 30, 1945 |
| 2,436,847 | Wolfson | Mar. 2, 1948 |
| 2,470,666 | Suffield | May 17, 1949 |
| 2,591,308 | Singiser | Apr. 1, 1952 |
| 2,691,774 | De Gier | Oct. 12, 1954 |

FOREIGN PATENTS

| | | |
|---|---|---|
| 675,925 | Great Britain | July 16, 1952 |